(12) United States Patent
Krahula et al.

(10) Patent No.: US 7,121,772 B2
(45) Date of Patent: Oct. 17, 2006

(54) CUTTING INSERT

(75) Inventors: Pavel Krahula, Zábřeh na Moravě (CZ); Josefina Spáčilová, Šumperk (CZ)

(73) Assignee: Pramet Tools, S.R.O., (CZ)

( * ) Notice: Subject to any disclaimer, the term of this patent is extended or adjusted under 35 U.S.C. 154(b) by 0 days.

(21) Appl. No.: 11/115,738

(22) Filed: Apr. 27, 2005

(65) Prior Publication Data

US 2005/0254909 A1    Nov. 17, 2005

(30) Foreign Application Priority Data

Apr. 30, 2004   (CZ) .................................. 2004-553

(51) Int. Cl.
 *B23B 27/16*   (2006.01)
(52) U.S. Cl. .................. 407/113; 407/114; 407/115; 407/116
(58) Field of Classification Search ................ 407/114, 407/113, 115, 110, 30, 40, 116; D15/139
See application file for complete search history.

(56) References Cited

U.S. PATENT DOCUMENTS

| 3,815,192 | A | | 6/1974 | Ohtsu et al. .................... 29/95 |
| 3,973,308 | A | | 8/1976 | Lundgren ....................... 29/95 |
| 4,597,696 | A | | 7/1986 | Maeda et al. ................ 407/114 |
| 4,741,649 | A | | 5/1988 | Mori ........................... 407/114 |
| 5,116,167 | A | * | 5/1992 | Niebauer ...................... 407/114 |
| 5,569,000 | A | * | 10/1996 | Littecke et al. .............. 407/114 |
| 5,584,616 | A | * | 12/1996 | Katbi et al. .................. 407/114 |
| D416,917 | S | * | 11/1999 | Xie et al. ................... D15/139 |

FOREIGN PATENT DOCUMENTS

| EP | A2 332 085 | 9/1989 |
| EP | A1 567 899 | 11/1993 |
| EP | 577 573 | 1/1994 |

* cited by examiner

*Primary Examiner*—Willmon Fridie, Jr.
(74) *Attorney, Agent, or Firm*—Ostrolenk, Faber, Gerb & Soffen, LLP

(57) ABSTRACT

An indexable cutting insert for chip removal machining, the insert having a polygonal body having opposed lower and upper faces that are mutually interconnected by peripheral faces meeting at rounded corners, which are formed symmetrically with respect to upper face bisectors. The upper face includes a mid portion, which is positioned inside of a chip face. Intersections of the chip face and the peripheral face forming major cutting edges and corner cutting edges. The chip face comprises a row of protrusions. A pair of oblong corner protrusions are provided at each corner area of the chip face. The pair is located symmetrically with respect to an associated bisector of the upper face. Each oblong corner protrusion has a longitudinal axis and at least two peak areas. The peak areas are positioned in line, essentially on the longitudinal axis of each oblong corner protrusion.

8 Claims, 5 Drawing Sheets

CUTTING INSERT

BACKGROUND OF THE INVENTION

The present invention relates to an indexable cutting insert for chip removal during machining.

Presently, cutting inserts of hard and wear resistant materials are used in tools for chip removal during machining. The geometry of some of these cutting inserts is such as to minimize power requirements for metal cutting operations. At the same time, the geometry of the cutting insert is required to allow chip breaking under a wide range of parameters, for example depth of cut or feed speed. Several cutting inserts comprise upper face protrusions adapted to facilitate the development and breaking of chips. These well-known designs of the cutting inserts however require usage of high cutting power to overcome higher frictional force arising at protrusions on the upper face.

A cutting insert disclosed in U.S. Pat. No. 3,815,192 comprises several protrusions of circular basic shape along the perimeter of the upper face defining zones of chip formation among them. According to U.S. Pat. No. 3,973,308, several notches are formed on the upper face of the cutting insert to allow chips to slip by without substantial deformation.

In the design according to EP-A2-332 085, the cutting insert has the shape of a polygonal body and comprises opposed upper and lower faces and a peripheral wall therebetween. The cutting edge is formed at the intersection of the upper face and a peripheral wall. The cutting insert has several spatial protrusions in the shape of oblong ribs on the upper and lower faces, which ribs serve to break the chip. In the solution according to EP 577 573, the cutting insert corner has spaced protrusions symmetrically organized relative to the bisector of cutting corner.

Further known is the cutting insert according to U.S. Pat. No. 4,741,649, where chip breaking is done by several protrusions, which are connected with a mid portion of the upper face and have a truncated spherical shape and which differ in size such that smaller protrusions are located close to the cutting corners, where the width is narrower. At chip breaking with this cutting insert, the chip has undesirably large contact with the spherical area of the protrusion and with a concave rear face, which causes higher frictional forces and thereby increases cutting forces and heat dissipation, such that heat transfers into cutting insert. A similar solution can be seen in U.S. Pat. No. 4,597,696.

In the design according to EP-A1-567 899, the cutting insert corner has a bean-shaped protrusion split by a narrow groove in the direction of the bisector of the insert corner. One disadvantage of this known solution is decreased protection of the cutting corner since abrasion of the protrusion arises due to friction from chips and deformation and directional change of chip direction during the cutting process caused by the narrow groove, which decreases durability of the cutting insert.

OBJECTS OF THE INVENTION

The cutting insert according to the invention is constructed to lower cutting forces during cutting, owing to a decrease of cutting resistance. This effect is reached by operating with low frictional force between the chip and an area of corner protrusions on the chip face of the upper face. Because the contact area of the chip and the chip face of the upper face is reduced, the contact resistance of rising chips at the upper face, which has the function of chip forming, is reduced, and thereby comes to decrease heat generation at the reduced contact area between the chip and the upper face. A further advantage of the cutting insert according to the present invention is easier breaking of the chip and suitable guidance of outgoing chips, thereby increasing protection of the cutting corners and the cutting edges from outgoing chips, which in total leads to increase of durability of the cutting insert.

SUMMARY OF THE INVENTION

The above-mentioned disadvantages are largely solved by a cutting insert according to the present invention for chip removal during machining, having a polygonal body with opposed lower and upper faces that are mutually interconnected by peripheral faces meeting at rounded corners, which are created symmetrically with respect to upper face bisectors. The upper face comprises a mid portion, which is positioned inside of a chip face. Intersections of the chip face and the peripheral face form major cutting edges and corner cutting edges. The chip face comprises a row of protrusions. A pair of oblong corner protrusions are provided at each corner area of the chip face. The pair is located symmetrically with respect to an associated bisector of the upper face. Each oblong corner protrusion has a longitudinal axis and at least two peak areas. Those peak areas are positioned in line essentially on the longitudinal axis of each oblong corner protrusion.

Furthermore, at least a first peak of the corner protrusion, located closer to the peripheral face, is placed distant from the bisectors of the upper face.

In addition, the first peak of the corner protrusion is spatially more extensive than a second peak located closer to the mid portion of the upper face.

Moreover, the corner protrusions form a general V-shape, and the lengthwise axes of the corner protrusions enclose an angle, selected in the range of 40° to 75°.

Furthermore, the protrusions in the row of protrusions are mutually spaced and spaced from the mid portion of the upper face.

In addition, the mid portion is preferably planar.

Other features and advantages of the present invention will become apparent from the following description of the invention which refers to the accompanying drawings.

BRIEF DESCRIPTION OF THE DRAWINGS

Particular designs of cutting inserts according to the invention are schematically illustrated in the enclosed drawings, wherein.

DETAILED DESCRIPTION OF EMBODIMENTS OF THE INVENTION

Figure 1A:
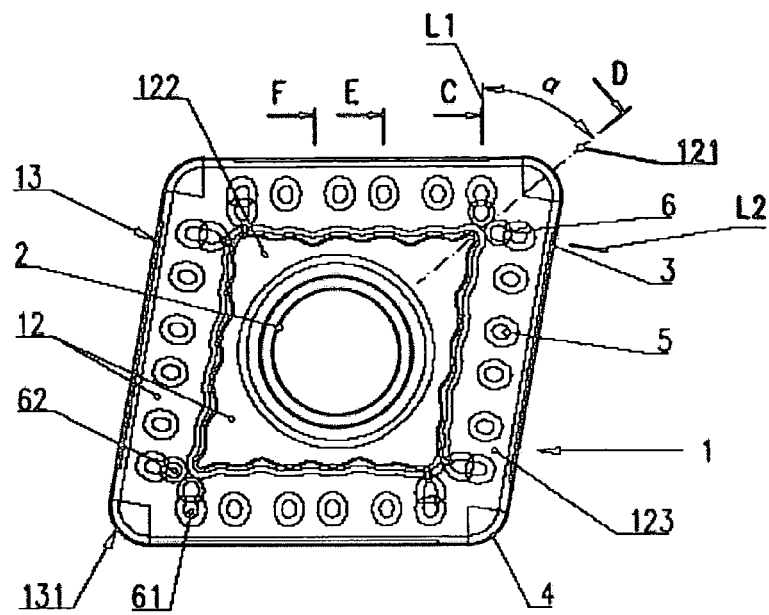
FIG. 1A is a plan view of one embodiment of a cutting insert according to the present invention.
Figure 1B:
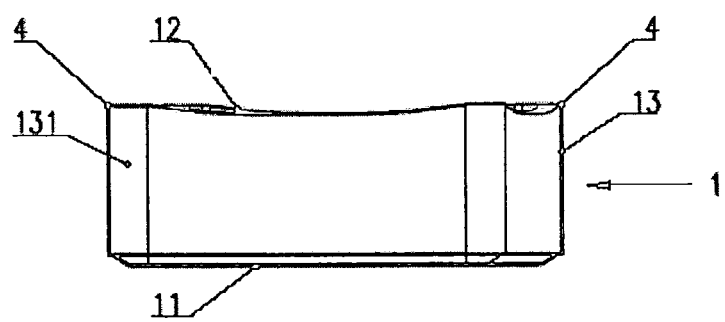
FIG. 1B is a side view of the cutting insert in FIG. 1A.
Figure 1C:
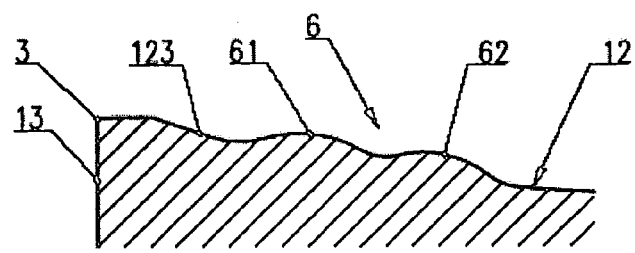
FIG. 1C is a cross-section of the cutting insert according to line C in FIG. 1A.
Figure 1D:
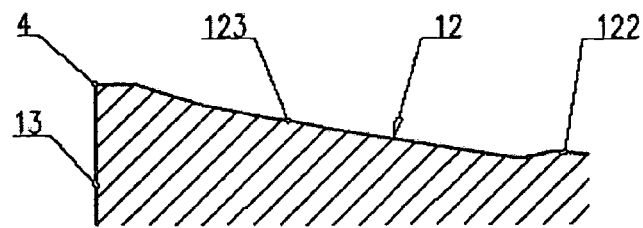
FIG. 1D is a cross-section of the cutting insert according to line D in FIG. 1A.
Figure 1E:
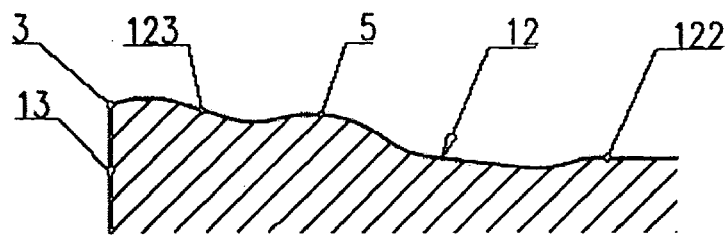
FIG. 1E is a cross-section of the cutting insert according to line E in FIG. 1A.
Figure 1F:
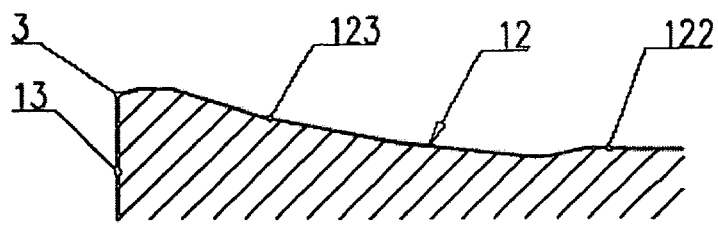
FIG. 1F is a cross-section of the cutting insert according to line F in FIG. 1A.
Figure 1G:
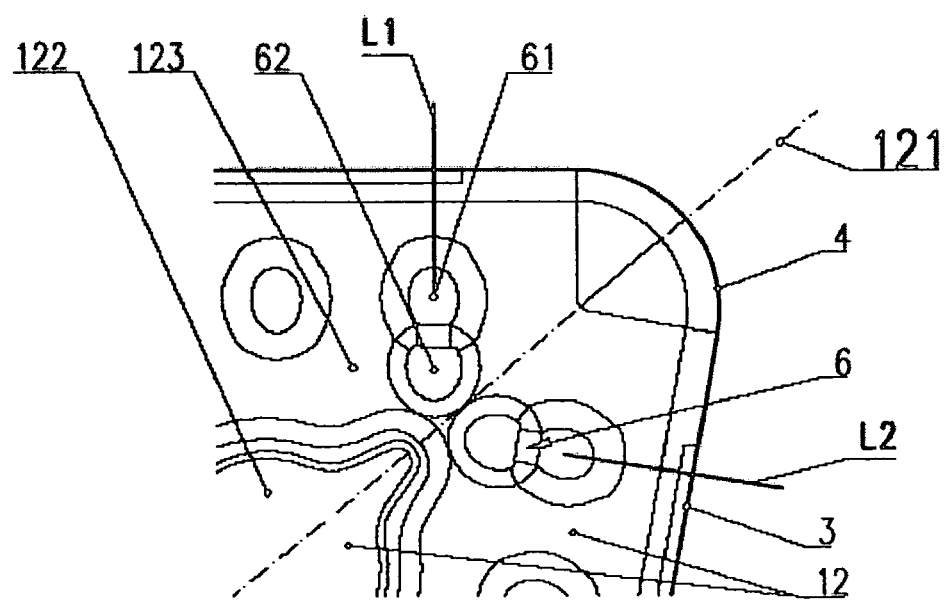
FIG. 1G is an enlarged detail of a cutting corner of the cutting insert in FIG. 1A.
Figure 2A:
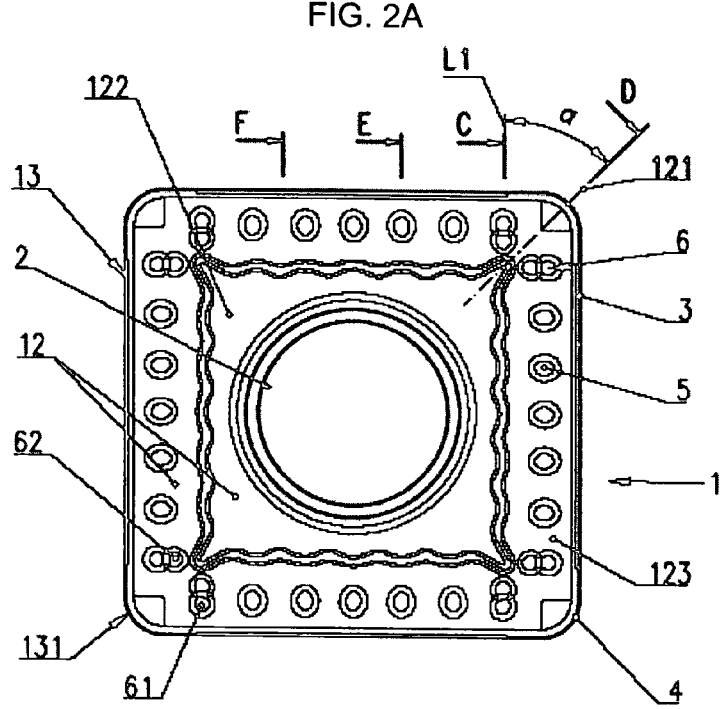
FIG. 2A is a plan view of an alternative embodiment of a cutting insert according to the present invention.
Figure 2B:
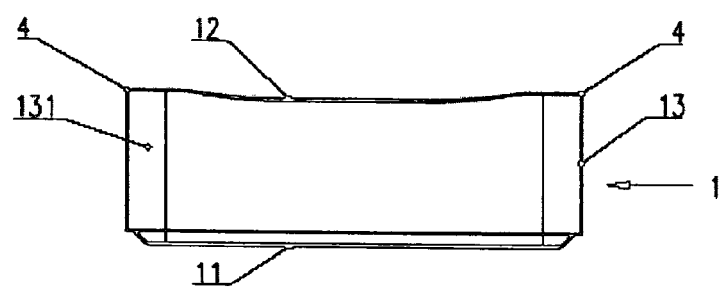
FIG. 2B is a side view of the cutting insert in FIG. 2A.
Figure 2C:
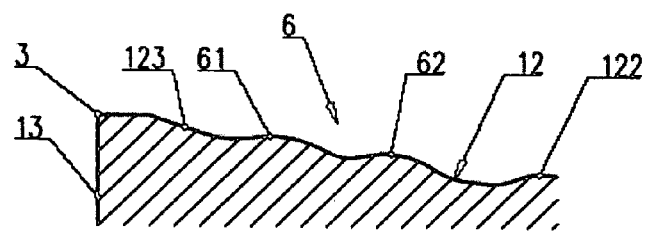
FIG. 2C is a cross-section of the cutting insert according to line C in FIG. 2A.
Figure 2D:
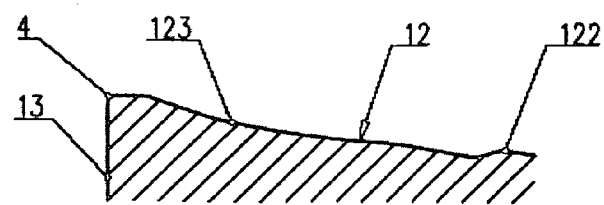
FIG. 2D is a cross-section of the cutting insert according to line D in FIG. 2A.
Figure 2E:
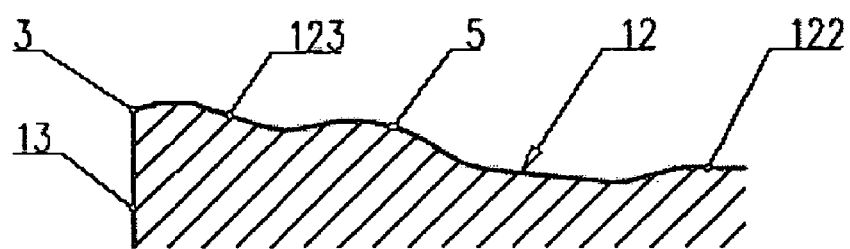
FIG. 2E is a cross-section of the cutting insert according to line E in FIG. 2A.
Figure 2F:
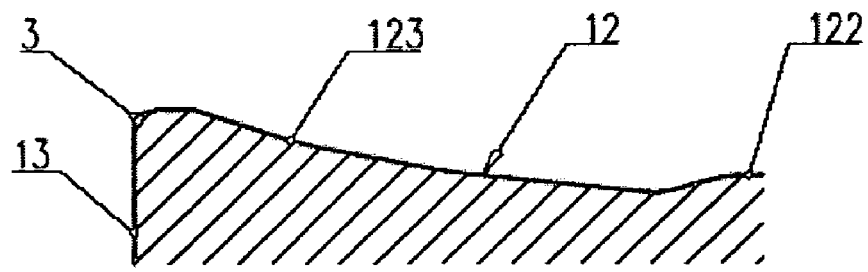
FIG. 2F is a cross-section of the cutting insert according to line F in FIG. 2A.

The cutting insert according to the invention has a polygonal body 1, with a basic shape that is rhombic, as is illustrated in FIG. 1A, or square, as is illustrated in FIG. 2A and which is provided with a centrally positioned clamping opening 2. The body 1 has a lower face 11 and an upper face 12, which are mutually interconnected by peripheral faces 13 containing four rounded corners 131, which are created symmetrically with respect to bisectors 121 of the upper face 12. The upper face 12 contains an essentially smooth or planar mid portion 122, which gradually connects to a chip face 123. The intersections of the chip face 123 of the upper face 12 with the peripheral face 13 create major cutting edges 3 and corner cutting edges 4. Each corner cutting edge 4 is formed symmetrically with regard to the bisector 121 of the corner 131, as illustrated in FIG. 1G.

Several individual and mutually spaced protrusions 5 are located on the chip face 123 of the upper face 12 alongside of the major cutting edges 3. Each protrusion 5 is preferably oval in plan view, as illustrated in FIG. 1A or 2A. A pair of oblong corner protrusions 6 is created at the corner area of the chip face 123. Said pair is located symmetrically with regard to the bisector 121 of the upper face 12 such that the longitudinal axis L1 or L2 of each protrusion 6 enclose an acute angle α with the bisector 121. The size of the acute angle α varies in range of α=40o to 75o. Each corner protrusion 6 is formed with two peaks 61, 62 in a row, where a first peak 61 located closer to the peripheral face 13 is spatially more extensive than a second peak 62 located closer to the bisector 121.

Tests of the new cutting insert according to the present invention described below have shown that the upper face discloses a reduced wear area at the first peak 61 and the second peak 62 at the corner protrusion 6 and thereby also reduced contact resistance of outgoing chip and reduced cutting forces. The first peak 61 protects the corner cutting edge 4 and the second peak 62 supports formation and breaking of chip and guides chips away from the corner cutting edges 4 and thus increases the durability of the cutting insert.

Test No. 1

Figure 3:
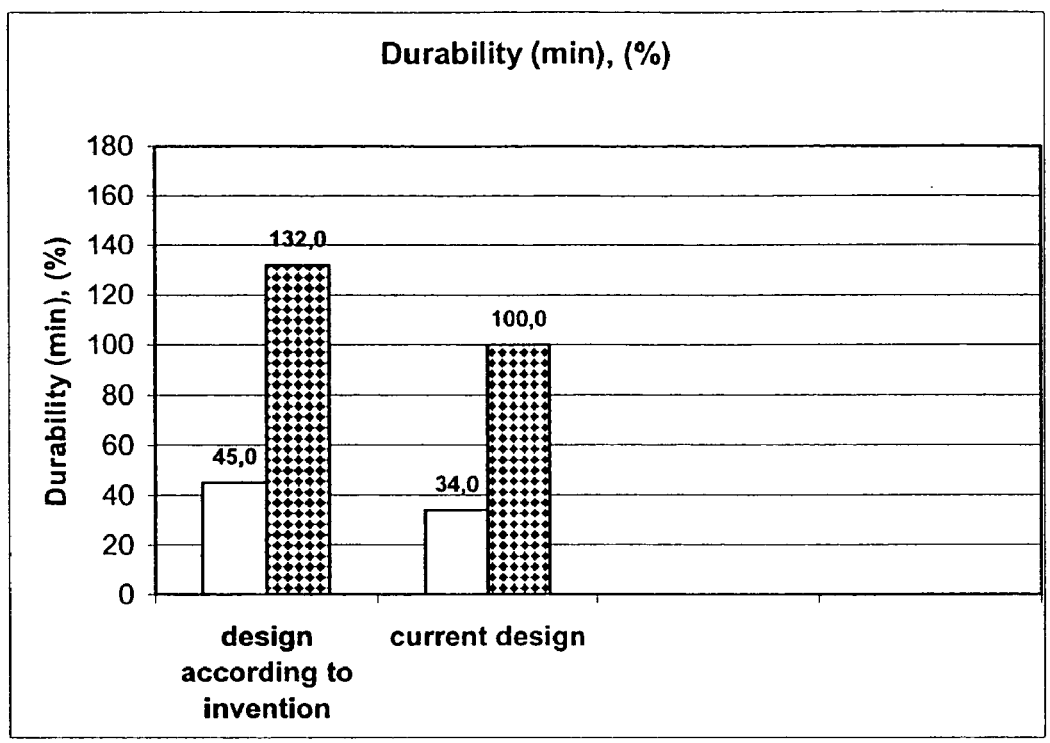
FIG. 3 is a graph showing durability and cutting power for a cutting insert according to FIG. 1A as compared to a conventional cutting insert.

At cutting steel Ck 45 (ČSN 12050.9) of hardness 177–194 HB with a cutting insert CNMM 190616 in a design according to the invention—as illustrated in FIG. 1A—under the following cutting conditions:
 speed=150 m/min
 feed=0.562 mm/rev
 depth of cut=5.0 mm the durability for flank wear of 0.25 mm achieved for the cutting insert according to the present invention was 45 minutes, while a conventional design lived only 34 minutes. From FIG. 3, it is evident that durability of the cutting insert according to the invention increased by 32%, because the corner protrusion 6 better serves to protect the corner cutting edge 4 for a longer time and helps form suitable chips and leading off chips from the corner cutting edge 4 and the major cutting edge 3.

Furthermore, cutting forces have been measured at depth of cut 5.0 mm and feed 0.4; 0.6; and 1.0 mm/rev, i.e. axial cutting force, tangential cutting force and radial cutting force. Using cutting inserts according to the invention, lower values than by using cutting inserts according to current or conventional design were achieved, which is evident from values shown in Table 1.

|  | tangential cutting force Ft (N) | axial cutting force Fa (N) | radial cutting force Fr (N) | feed f (mm/AT) |
|---|---|---|---|---|
| Design according to the invention | 3496 | 1649 | 633 | 0.4 |
| Current design | 5824 | 2287 | 923 | 0.6 |
|  | 8076 | 2579 | 1196 | 1.0 |
|  | 3716 | 1864 | 811 | 0.4 |
|  | 6279 | 2444 | 1245 | 0.6 |
|  | 8778 | 2812 | 1560 | 1.0 |

Test No. 2

Figure 4:
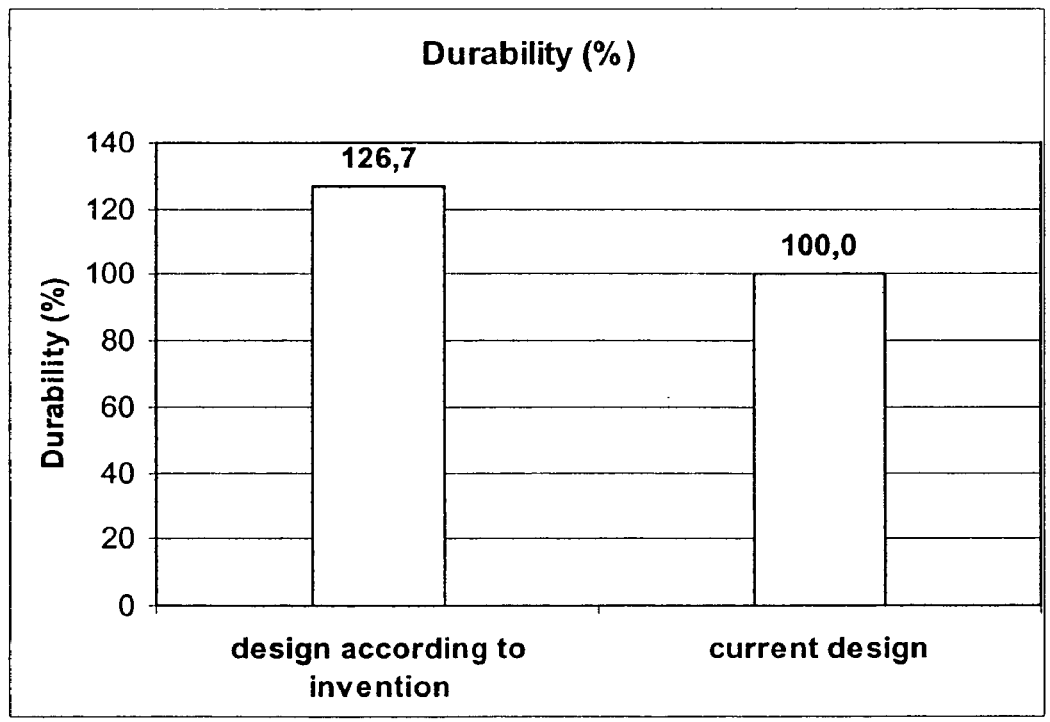
FIG. 4 is a graph showing durability for a cutting insert according to FIG. 2A as compared to a conventional cutting insert.

At turning of steel Ck 45 (ČSN 12050.9) with hardness 177–194 HB, the cutting insert SNMM 190616 in a design according to the invention—as illustrated by FIG. 2A—under the following cutting conditions:
 speed=160 m/min
 feed=0.562 mm/rev
 depth of cut=4.0 mm The durability measured at flank wear 0.25 mm of the cutting insert according to the invention was 57 minutes. At a current design the life was only 45 minutes. From FIG. 4, it is evident, that the durability of the cutting insert according to the invention increases by 26% in comparison to cutting inserts of current design, because the corner protrusion 6 according to this invention better serves to protect the cutting corner 131, for the reason as mentioned in the description of test No. 1.

The cutting insert according to the invention is possible to be used preferably for chip removal machining of materials in conditions from medium turning operations to heavy rougher turning operations.

The described designs of the cutting inserts are not the only possible use of invention essence, because the cutting insert can have another polygonal basic shape, and can have a plan view that is triangular, rectangular, pentagonal, hexagonal or octagonal. Corner protrusions do not have to comprise only two peaks, but particular types of cutting inserts can have three or more peaks.

Although the present invention has been described in connection with preferred embodiments thereof, it will be appreciated by those skilled in the art that additions, deletions, modifications, and substitutions not specifically described may be made without departing from the scope of the invention as defined in the appended claims.

What is claimed is:

1. An indexable cutting insert for chip removal machining, the insert having
   a polygonal body having opposite lower and upper faces, peripheral faces which meet at rounded corners and mutually interconnect the upper and lower faces, the corners being symmetrically located with respect to upper face bisectors;
   the upper face including a mid portion, and a chip face around the mid portion, intersections of the chip face and the peripheral faces forming major cutting edges and corner cutting edges at the corners;
   the chip face comprising a row of protrusions out of the upper face, a respective pair of oblong corner protrusions at each corner area of the chip face, each pair of protrusions being located symmetrically with respect to an associated bisector of the upper face, each oblong corner protrusion having a longitudinal axis and comprising at least two peak areas, the peak areas are positioned in line essentially on the longitudinal axis of each oblong corner protrusion.

2. The indexable cutting insert according to claim 1, wherein at least a first peak of the corner protrusion which is located closer to the peripheral face is placed more distant from the associated bisector than a second peak.

3. The indexable cutting insert according to claim 2, wherein the first peak of the corner protrusion is spatially more extensive than the second peak thereof, and the second peak is located closer to the mid portion of the upper face.

4. The indexable cutting insert according to claim 1, wherein the corner protrusions form a generally V-shape, and wherein a respective lengthwise axis of each of the corner protrusions forms an acute angle with the associated bisector, the angle being in the range of 40° to 75°.

5. The indexable cutting insert according to claim 1, wherein the protrusions in the row of protrusions are mutually spaced and spaced from the mid portion of the upper face.

6. The indexable cutting insert according to claim 1, wherein the mid portion is planar.

7. The indexable cutting insert according to claim 1, wherein the first peak of the corner protrusion is spatially more extensive than a second peak thereof, and the second peak located closer to the mid portion of the upper face.

8. The indexable cutting insert according to claim 1, wherein the corner protrusions form a generally V-shape, and wherein a respective lengthwise axis of each of the corner protrusions forms an acute angle with the associated bisector, the angle being in the range of 40° to 75°.

* * * * *